US008531440B2

(12) United States Patent
Chiu

(10) Patent No.: US 8,531,440 B2
(45) Date of Patent: Sep. 10, 2013

(54) COLUMN DRIVER DEVICE, DRIVING DEVICE, AND RELATED SERIAL TRANSMISSION DEVICE FOR A LIQUID CRYSTAL DISPLAY DEVICE

(75) Inventor: Wei-Ta Chiu, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 919 days.

(21) Appl. No.: 12/269,867

(22) Filed: Nov. 12, 2008

(65) Prior Publication Data

US 2009/0184948 A1 Jul. 23, 2009

(30) Foreign Application Priority Data

Jan. 22, 2008 (TW) ................................ 97102358 A

(51) Int. Cl.
*G06F 3/038* (2013.01)

(52) U.S. Cl.
USPC .............................. 345/204; 345/98; 345/100

(58) Field of Classification Search
USPC ...................... 345/87, 98, 100, 204; 341/144
See application file for complete search history.

(56) References Cited

U.S. PATENT DOCUMENTS

| | | | | |
|---|---|---|---|---|
| 6,424,281 | B1 * | 7/2002 | Liaw et al. | 341/144 |
| 6,747,623 | B2 * | 6/2004 | Koyama | 345/87 |
| 7,095,398 | B2 * | 8/2006 | Fish | 345/100 |
| 2004/0135757 | A1 * | 7/2004 | Park et al. | 345/98 |
| 2005/0184978 | A1 * | 8/2005 | Bu et al. | 345/204 |
| 2005/0200590 | A1 * | 9/2005 | Kumekawa | 345/100 |
| 2006/0262065 | A1 * | 11/2006 | Luo et al. | 345/98 |

FOREIGN PATENT DOCUMENTS

| | | | |
|---|---|---|---|
| CN | 1700291 | A | 11/2005 |
| CN | 1959793 | A | 5/2007 |
| TW | 367071 | | 8/1999 |

* cited by examiner

*Primary Examiner* — Quan-Zhen Wang
*Assistant Examiner* — Troy Dalrymple
(74) *Attorney, Agent, or Firm* — Winston Hsu; Scott Margo

(57) ABSTRACT

The present invention discloses a serial transmission device for reducing instantaneous current including an input terminal for receiving serial data, a coding module coupled to the receiving terminal comprising a plurality of coding units in series for transforming the serial data to a plurality of coding results according to a plurality of coding schemes, and a plurality of output terminals respectively coupled to the plurality of coding units of the coding module for outputting the plurality of coding results.

6 Claims, 10 Drawing Sheets

60

| Value | Binary Code | Gray Code |
|---|---|---|
| 0 | 000 | 000 |
| 1 | 001 | 001 |
| 2 | 010 | 011 |
| 3 | 011 | 010 |
| 4 | 100 | 110 |
| 5 | 101 | 111 |
| 6 | 110 | 101 |
| 7 | 111 | 100 |

FIG. 6

COLUMN DRIVER DEVICE, DRIVING DEVICE, AND RELATED SERIAL TRANSMISSION DEVICE FOR A LIQUID CRYSTAL DISPLAY DEVICE

BACKGROUND OF THE INVENTION

1. Field of the Invention

The present invention relates to a column driver device, a driving device and a related serial transmission device for a liquid crystal display device, and more particularly, to a column driver device, a driving device and a related serial transmission device for reducing instantaneous current for enhancing reliability of the devices by averaging the effect resulting from signal level change of the devices according to different coding schemes.

2. Description of the Prior Art

With the advancement of display technology, the size of a panel in a liquid crystal display (LCD) device is getting larger to meet demands, which results in an increase in the number of pixels in the panel and heavy loading of data transmission. For this reason, a prior art serial transmission device provides a solution to improve the above problem.

Please refer to FIG. 1. FIG. 1 is a schematic diagram of a driving device 10 in an LCD device according to the prior art. The driving device 10 is a serial transmission device, which comprises a timing controller 102 and source drivers, also called column drivers, SD_1 to SD_n. The timing controller 102 is utilized for performing signal processes for outputting displaying data to a source driver SD_1. The source drivers SD_1 to SD_n are in series for outputting data line signals to data line groups DLS_1 to DLS_n on the panel, wherein each data line group comprises at least one data line. Now describe the operation of the source drivers SD_1 to SD_n. The source driver SD_1 receives data corresponding to a data line group DLS_1 from the displaying data outputted from the timing controller 102, performs related processes on the received data for generating results, and outputs the results to the data line group DLS_1. Meanwhile, the source driver SD_1 transfers the displaying data outputted from the timing controller 102 to a source driver SD_2. The source driver SD_2 performs processes similar to the source driver SD_1 and then transfers the displaying data to a source driver SD_3, and so forth. As a result, the driving device 10 outputs the displaying data to the data line groups DLS_1 to DLS_n on the panel for displaying a frame.

However, when signal level of the displaying data changes, for example the displaying data changes from 0 to 1 or from 1 to 0, the current consumption of the driving device 10 increases. The signal level change results in a large instantaneous current that may lead to abnormal voltage rise/drop or a temperature rise, so as to result in a state transfer failure or abnormal displaying, moreover, a reliability problem of the driving device 10.

SUMMARY OF THE INVENTION

It is therefore a primary objective of the claimed invention to provide a column driving device, a driving device and related serial transmission device for a liquid crystal display (LCD) device.

The present invention discloses a serial transmission device for reducing instantaneous current comprising an input terminal for receiving serial data, a coding module coupled to the input terminal comprising a plurality of coding units in series for transforming the serial data to a plurality of coding results according to a plurality of coding schemes, and a plurality of output terminals respectively coupled to the plurality of coding units of the coding module for outputting the plurality of coding results.

The present invention further discloses a column driving device for an LCD device comprising a serial data generator coupled to a timing controller of the LCD device for transforming parallel data to serial data, a coding module coupled to the serial data generator comprising a plurality of coding units in series for transforming the serial data to a plurality of coding results according to a plurality of coding schemes, a latch module coupled to the coding module for storing the plurality of coding results, and a decoding module coupled to the latch module for performing decoding processes on the plurality of coding results for generating a plurality of column driving signals according to the plurality of coding schemes.

The present invention further discloses a driving device for an LCD device comprising a timing controller for generating displaying data, a column driver module coupled to the timing controller comprising a plurality of column drivers in series for outputting the displaying data according to a plurality of coding schemes, wherein each column driver of the column driver module comprises an input terminal for receiving the displaying data, a coding unit coupled to the input terminal for transforming the displaying data to a coding result according to one of the plurality of coding schemes, a processing unit coupled to the coding unit for performing a signal process on the displaying data for generating a column driving signal, and an output terminal coupled to the coding unit for outputting the coding result to another column driver, and a display module coupled to the column driver module for displaying the displaying data according to a plurality of column driving signals outputted by the column driver module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a code table of binary code and Gray code.

DETAILED DESCRIPTION

Figure 1:
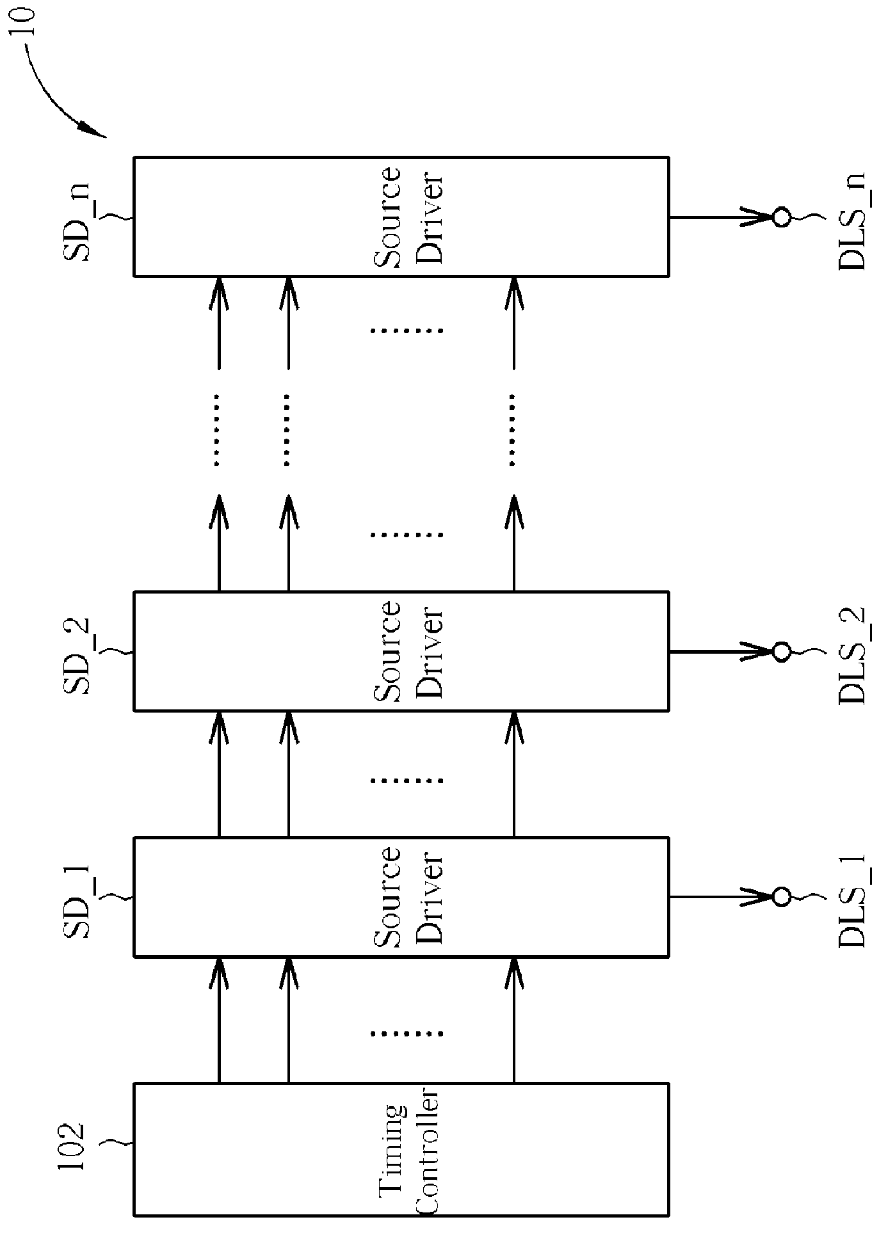
FIG. 1 PRIOR ART
FIG. 1 is a schematic diagram of a driving device in an LCD device according to the prior art.
Figure 2:
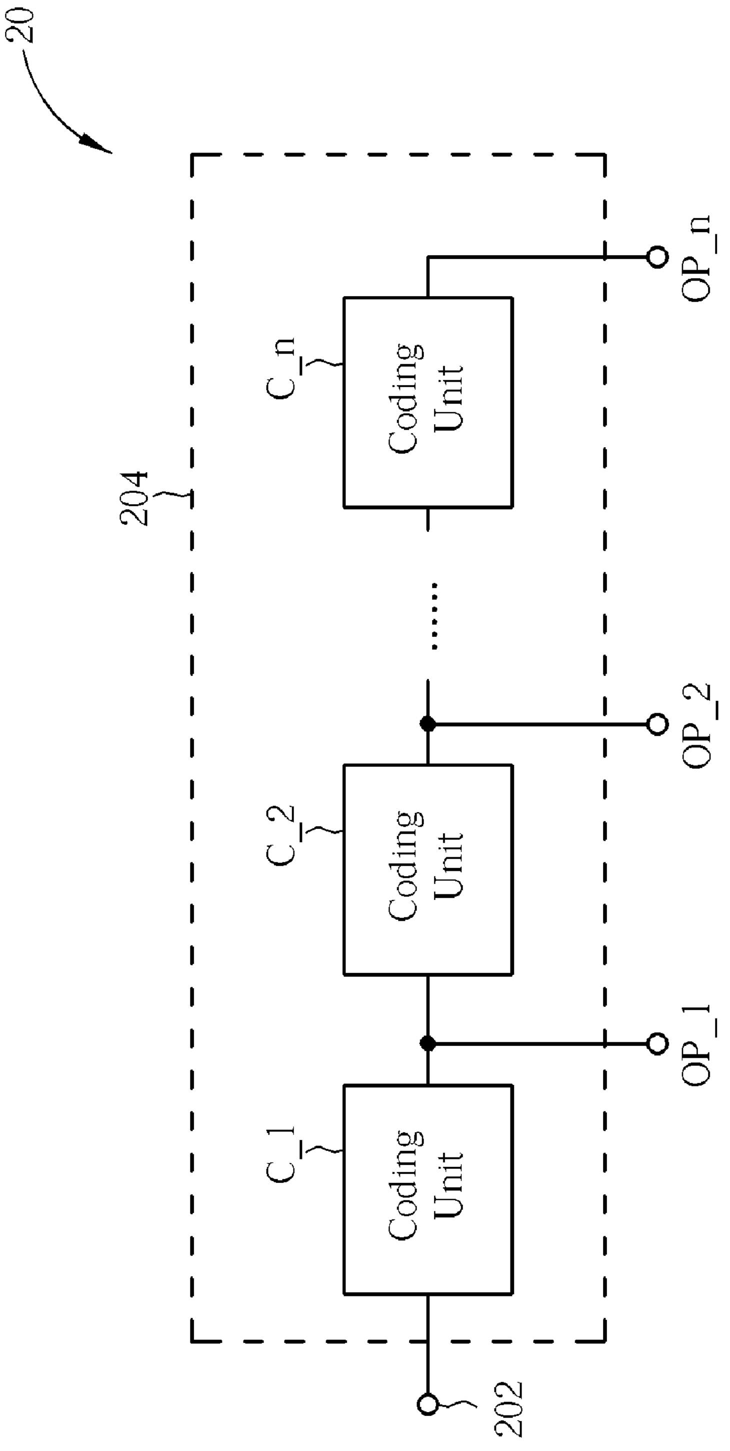
FIG. 2 is a schematic diagram of a serial transmission device according to an embodiment of the present invention.

Please refer to FIG. 2. FIG. 2 is a schematic diagram of a serial transmission device 20 according to an embodiment of the present invention. The serial transmission device 20 is utilized for reducing instantaneous current and comprises an input terminal 202, a coding module 204 and output terminals OP_1 to OP_n. The input terminal 202 is utilized for receiving serial data. The coding module 204 is coupled to the input terminal 202 and comprises coding units C_1 to C_n in series for transforming the serial data to coding results according to different coding schemes. The output terminals OP_1 to OP_n are respectively coupled to coding units C_1 to C_n for outputting the coding results. In detail, a coding unit C_1 performs a coding process on the serial data received by the input terminal 202 for generating a coding result, outputs the coding result via an output terminal OP_1 and at the same time, and transfers the coding result to a coding unit C_2. Next, the coding unit C_2 performs another coding process on the received coding result, outputs another coding result via an output terminal OP_2, and transfers the another coding result to a coding unit C_3, and so forth. As a result, the serial transmission device 20 outputs different coding results via the output terminals OP_1 to OP_n.

The serial data can be transformed to different coding results by different coding schemes. For example, if "01" is the original serial data, "00", "01", "10" or "11" is possible to be the coding result from different coding schemes. In other words, a data transfer state changes by different coding schemes. Therefore, compared to the serial data received by the input terminal 202, there may only a part of the coding results of the coding units C_1 to C_n with data transfer states. That is, the serial transmission device 20 can stagger data transfer states to prevent from increase of instantaneous current caused by signal level change.

Note that, the serial transmission device 20 is an embodiment of the present invention, and those skilled in the art can make alterations and modifications accordingly. For example, in the serial transmission device 20 the input terminal 202 can also be coupled to a parallel-to-serial converter utilized for transforming parallel data to the serial data first. In addition, the input terminal 202 can be coupled between any two coding units, for example, coding unit C_1 and C_2, or coupled to all of the coding units C_1 to C_n instead of being coupled to the nearest coding unit C_1, as shown in FIG. 2. Moreover, the number of the coding units is dependent on demands and the coding scheme corresponding to each coding unit can be any kind of code scheme, such as binary code, Gray code, Hamming code, Turbo code, and etc.

In a word, the serial transmission device 20 reduces instantaneous current by averaging the effect resulting from signal level change of the devices according to serial transmission and different coding schemes, so as to enhance reliability of the serial transmission device 20.

Figure 3:
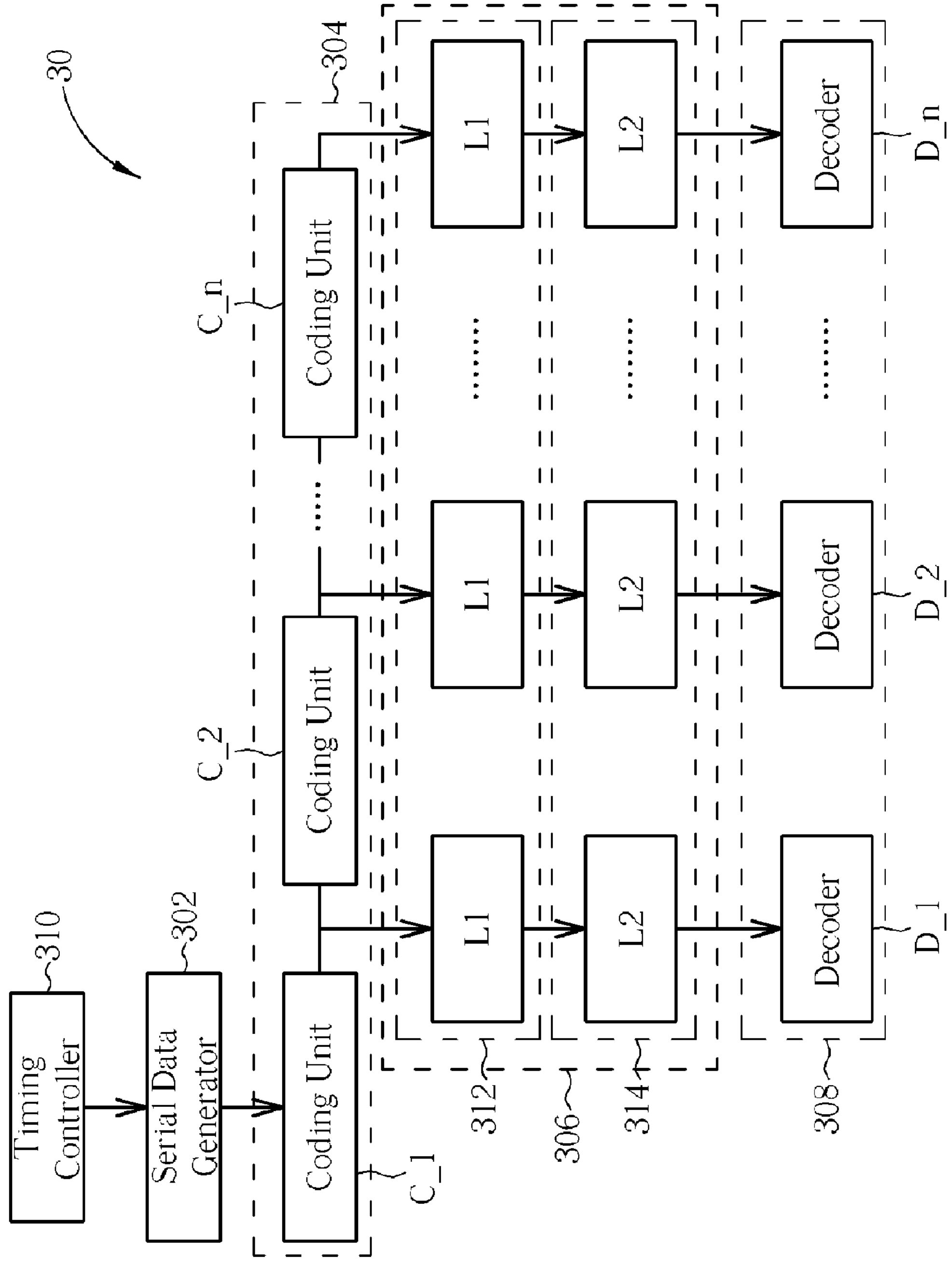
FIG. 3 is a schematic diagram of a column driving device in an LCD device according to an embodiment of the present invention.

From the above, the serial transmission device 20 can reduce instantaneous current by averaging the effect resulting from signal level change of the devices for enhancing reliability of the serial transmission device 20. Note that, the present invention can be applied in any kind of device or system using serial transmission. Please refer to FIG. 3. FIG. 3 is a schematic diagram of a column driving device 30 in an LCD device according to an embodiment of the present invention. The column driving device 30 comprises a serial data generator 302, a coding module 304, a latch module 306 and a decoding module 308. The serial data generator 302 is coupled to a timing controller 310 of the LCD device for transforming parallel data to serial data. The coding module 304 is coupled to the serial data generator 302 and comprises coding units C_1 to C_n in series for transforming the serial data to coding results according to different coding schemes. The latch module 306 is coupled to the coding module 304 for storing the coding results in latches L1 and L2. The decoding module 308 is coupled to the latch module 306 and comprises decoders D_1 to D_n for performing decoding processes on the coding results stored in the latch module 306 for generating corresponding column driving signals according to different coding schemes.

From the above, the serial data can be transformed to different coding results by different coding schemes. Therefore, compared to the original serial data outputted from the serial data generator 302, there may only a part of the coding results of the coding units C_1 to C_n with data transfer states. That is, the coding module 304 can stagger data transfer states to prevent from increase of instantaneous current caused by signal level change.

Note that, the column driving device 30 is an embodiment of the present invention, and those skilled in the art can make alterations and modifications accordingly. For example, the serial data generator 302 can be coupled between any two coding units, for example, coding unit C_1 and C_2, or coupled to all of the coding units C_1 to C_n instead of being coupled to the nearest coding unit C_1, as shown in FIG. 3. Moreover, the number of the coding units is dependent on demands and the coding scheme corresponding to each coding unit can be any kind of code scheme, such as binary code, Gray code, Hamming code, Turbo code, and etc.

Figure 4:
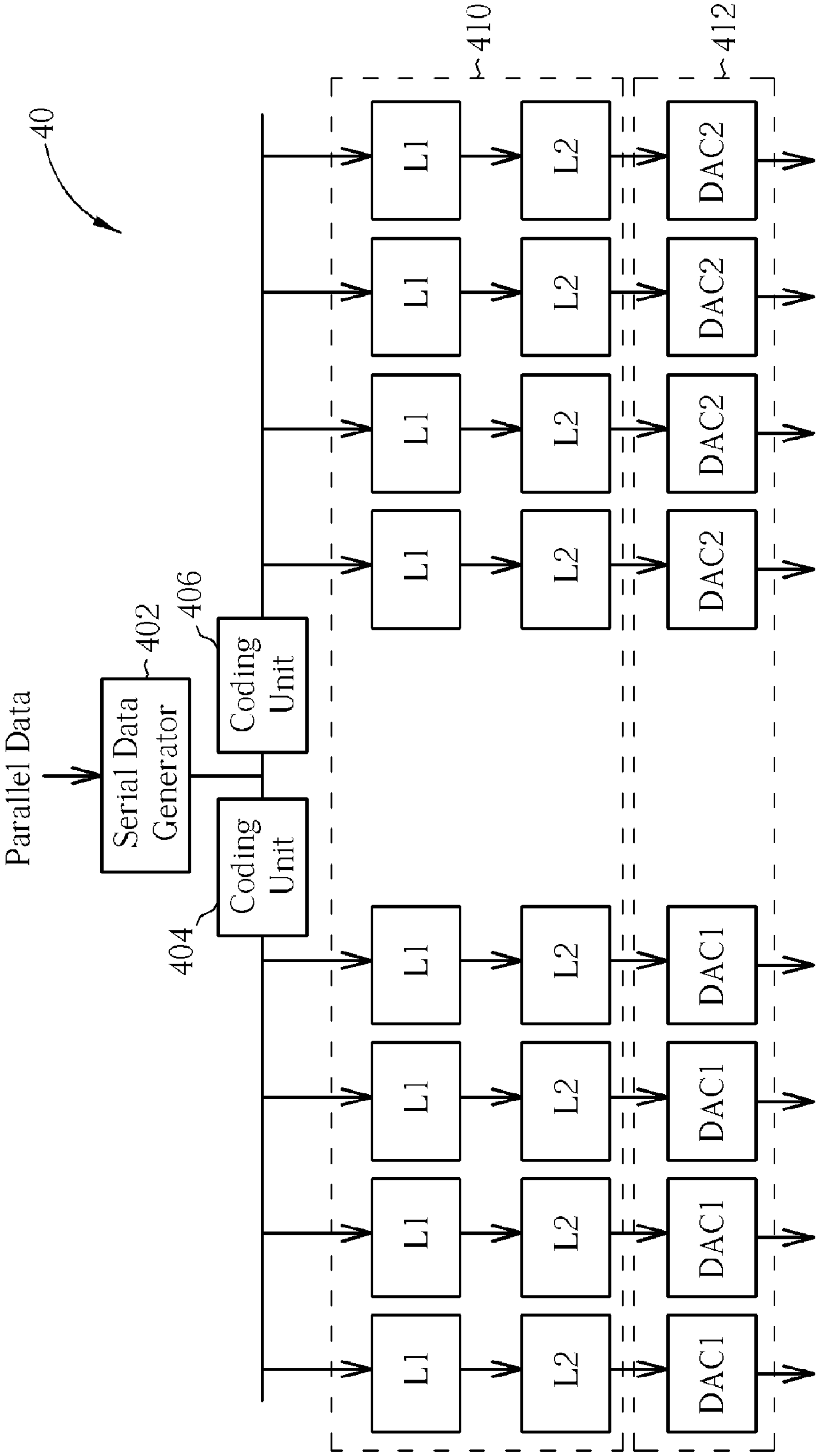
FIG. 4 is a schematic diagram of a column driving device in an LCD device according to an embodiment of the present invention.

In addition, please refer to FIG. 4. FIG. 4 is a schematic diagram of a column driving device 40 in an LCD device according to an embodiment of the present invention. The column driving device 40 comprises a serial data generator 402, coding units 404 and 406, a latch module 410 and a decoding module 412. The structure of the column driving device 40 is similar to the column driving device 30 and is not given here. The difference is, the column driving device 40 only comprises two coding units and the serial data generator 402 is coupled between the coding unit 404 and the coding unit 406. In this situation, the decoding module 412 comprises only two decoders, DAC1 and DAC2, corresponding to two different coding schemes, so as to reducing complexity and production cost. Therefore, according to the column driving device 40, the coding units 404 and 406 can stagger data transfer states to prevent from increase of instantaneous current caused by signal level change.

Figure 5:
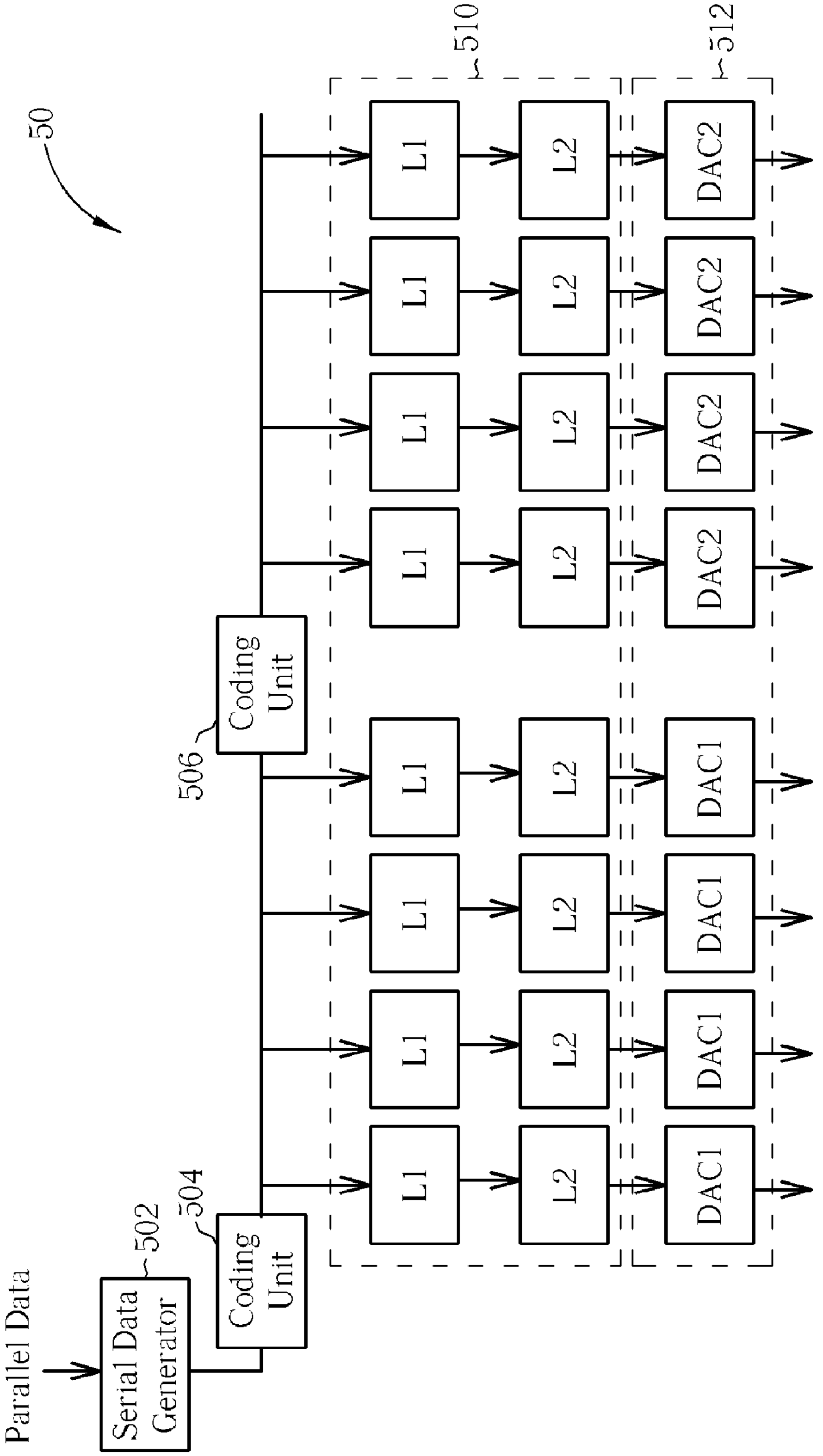
FIG. 5 is a schematic diagram of a column driving device in an LCD device according to an embodiment of the present invention.

Moreover, please refer to FIG. 5. FIG. 5 is a schematic diagram of a column driving device 50 in an LCD device according to an embodiment of the present invention. The column driving device 50 comprises a serial data generator 502, coding units 504 and 506, a latch module 510 and a decoding module 512. The structure of the column driving device 50 is similar to the column driving device 40 and is not given here. The difference is, the serial data generator 502 is only coupled to the coding unit 504. Similarly, the column driving device 50 can stagger data transfer states to prevent from increase of instantaneous current caused by digital signal level change.

The column driving device 40 and the column driving device 50 are embodiments of the present invention, which can stagger data transfer states according to two different coding schemes, and those skilled in the art can make alterations and modifications accordingly. For example, the corresponding coding schemes are not limited to specific coding schemes. For example, please refer to FIG. 6 for a code table of binary code and Gray code. As shown in FIG. 6, when 0 transfers to 7, the corresponding binary code transfers from 000 to 111 and the corresponding Gray code transfers from 000 to 100. That is, there are 3 data transfer states for using binary code and only 1 data transfer state for using Gray code, and the combination of binary code and Gray code can average the number of data transfer states to 2. Therefore, the column driving device 40 and the column driving device 50, which use the combination of binary code and Gray code, can reduce the number of data transfer states for reducing instantaneous current for preventing from overheat.

Figure 7:
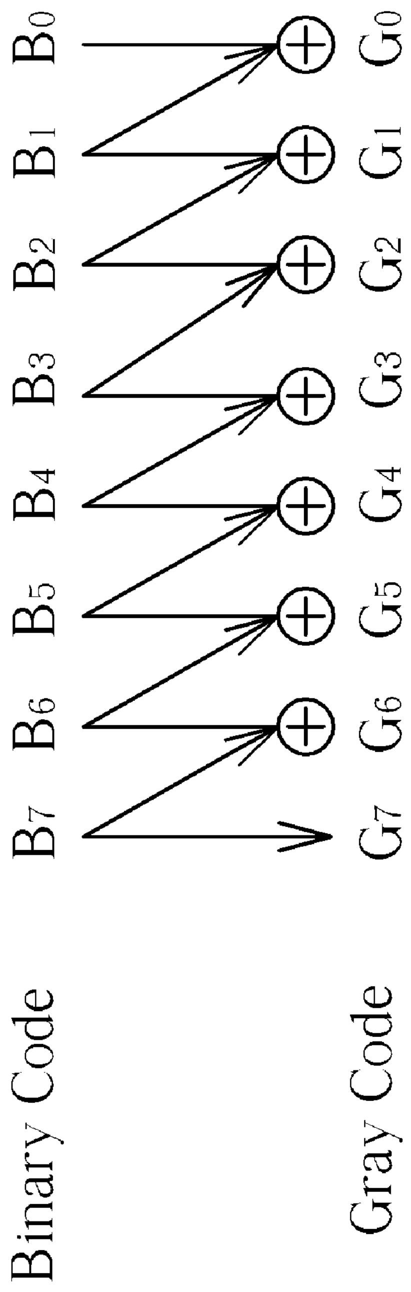
FIG. 7 is a schematic diagram of implementation of Gray code.
Figure 8:
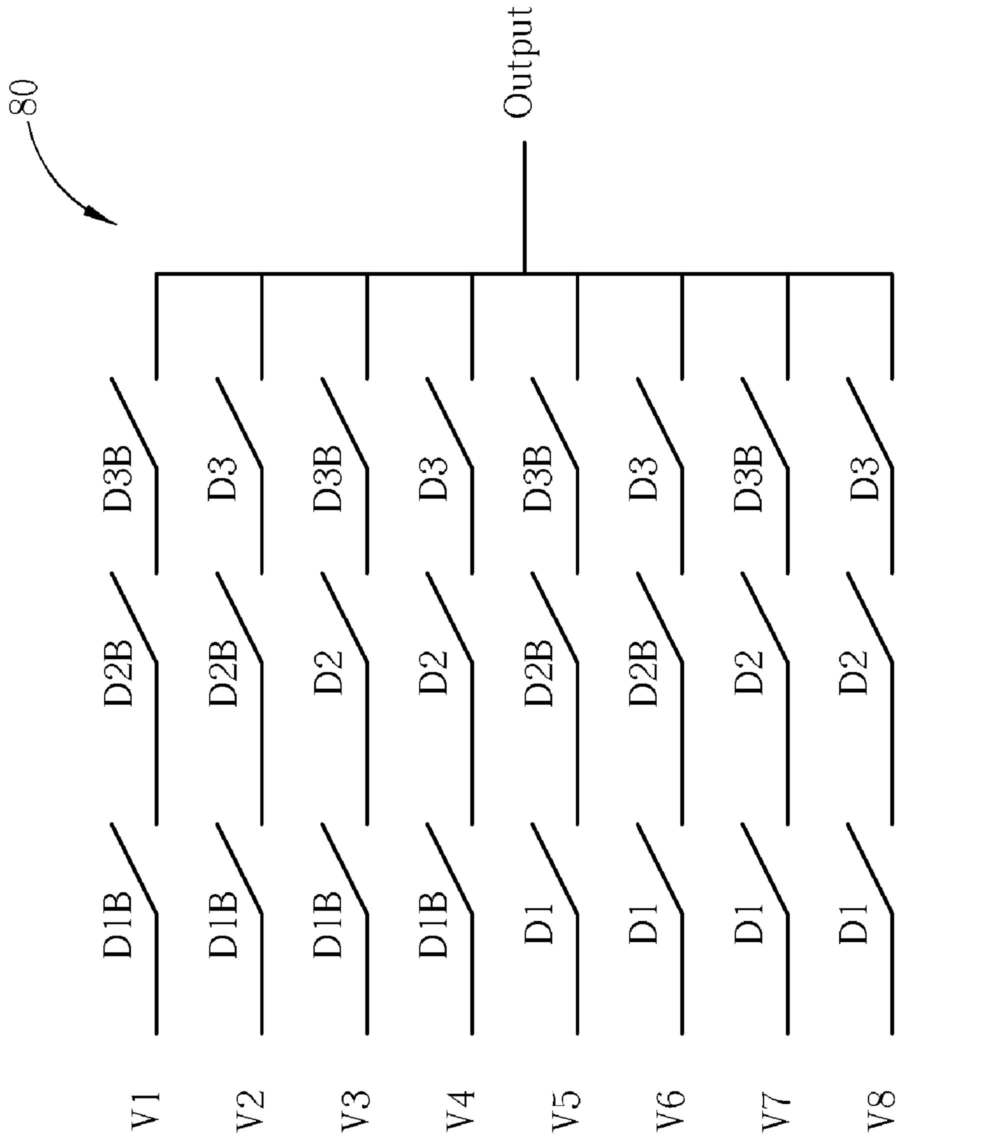
FIG. 8 is a schematic diagram of a binary decoder.
Figure 9:
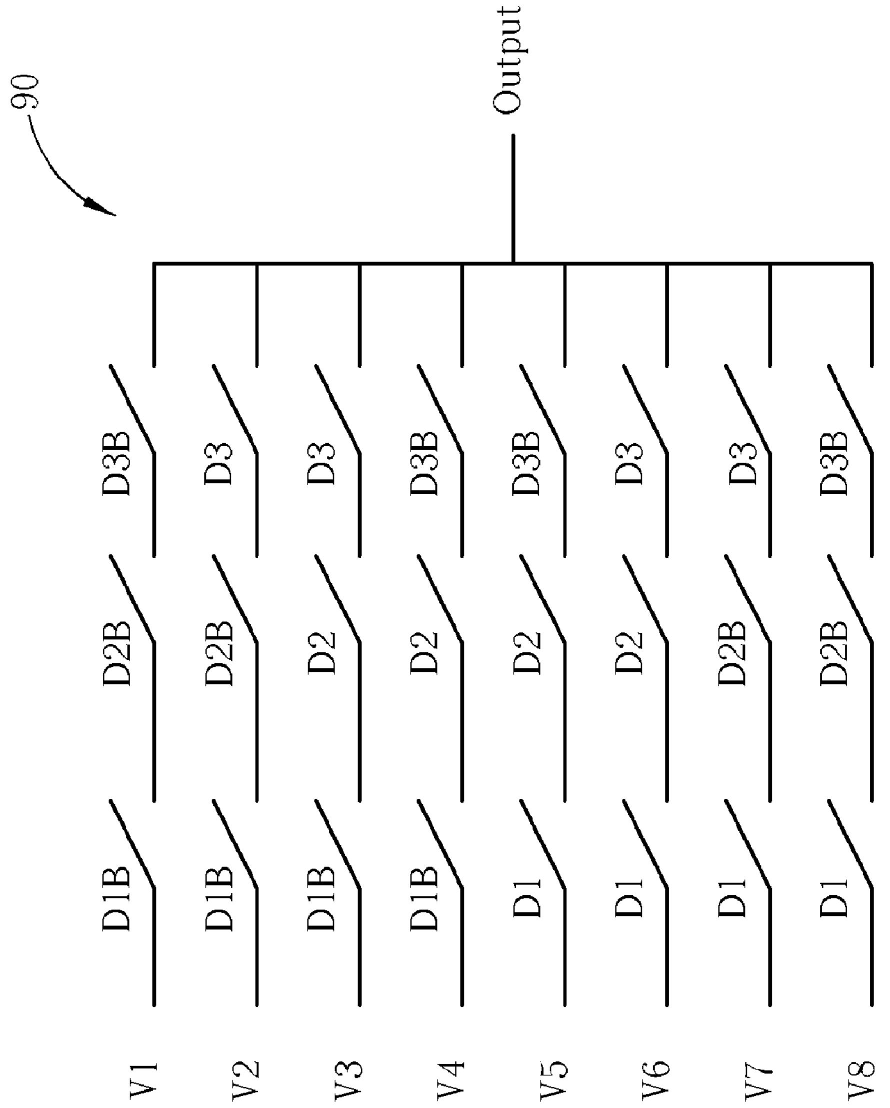
FIG. 9 is a schematic diagram of a Gray decoder.

Please refer to FIG. 7 for a schematic diagram of implementation of Gray code. Binary code transfers to Gray code by an exclusive-OR logic circuit. Please refer to FIG. 8 and FIG. 9 for implementation of decoders DAC1 and DAC2. FIG. 8 is a schematic diagram of a binary decoder 80. FIG. 9 is a schematic diagram of a Gray decoder 90. In FIG. 8 and FIG. 9, V1 to V8 represent 8 different voltage signals corresponding to 8 signal levels, 0 to 7. Switches D1 and D1B respectively control to output 1 and 0 for the most significant bit (MSB), switches D2 and D2B respectively control to output 1 and 0 for the second bit, and switches D3 and D3B respectively control to output 1 and 0 for the least significant bit (LSB). Therefore, the binary decoder 80 and the Gray decoder 90 can output correct signals according to ON/OFF state of these six switches. For example, if the received data is "100", the binary decoder 80 outputs a voltage signal V5 and the Gray decoder 90 outputs a voltage signal V8. Please note that FIG. 8 and FIG. 9 are examples of decoders, and other coding schemes and decoders also can be applied in the present invention.

Figure 10:
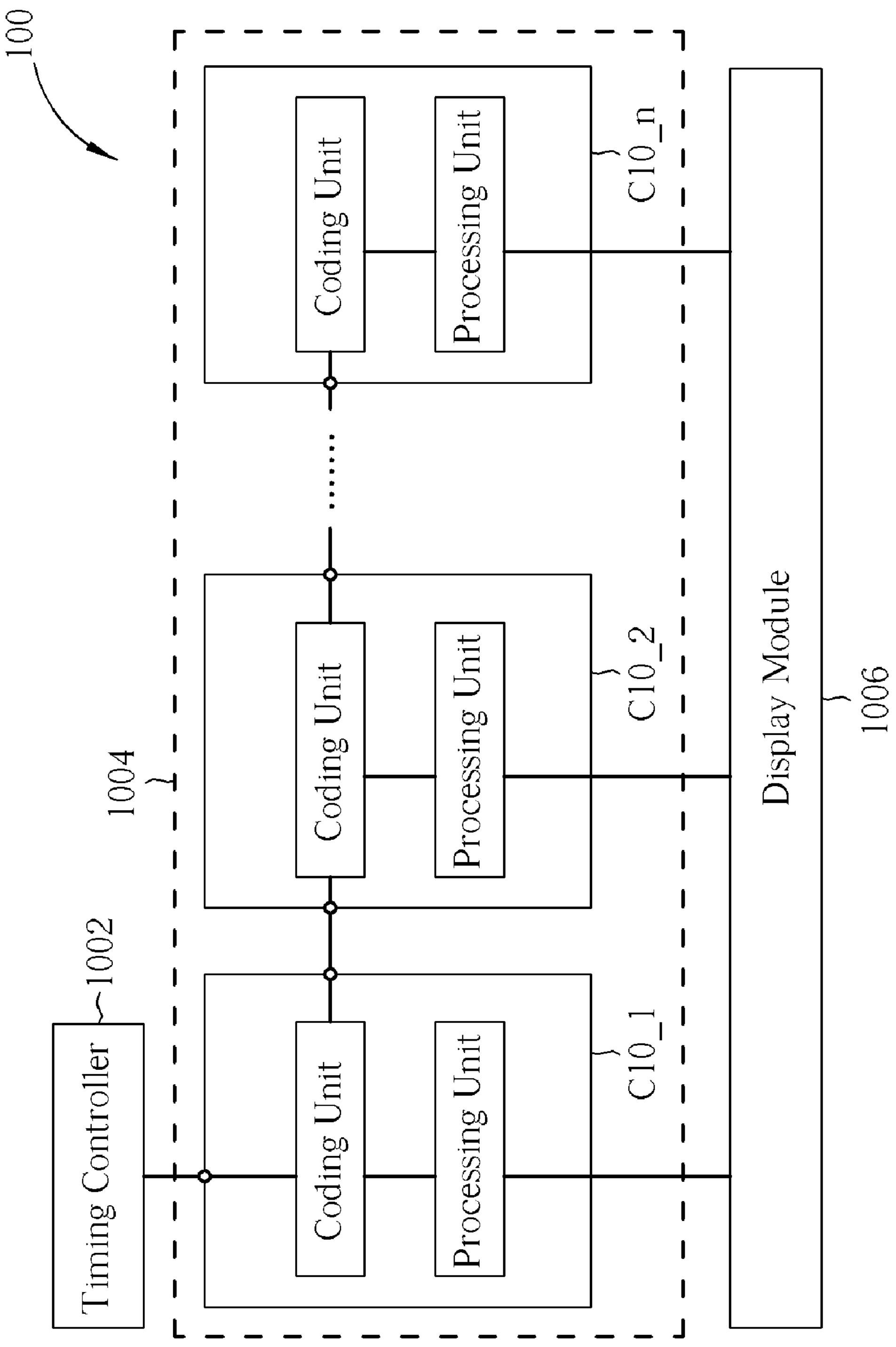
FIG. 10 is a schematic diagram of a driving device in an LCD device according to an embodiment of the present invention.

From the above, the present invention can be applied in any kind of device or system using serial transmission for reducing instantaneous current by averaging the effect resulting from signal level change. Please refer to FIG. 10. FIG. 10 is a schematic diagram of a driving device 100 in an LCD device according to an embodiment of the present invention. The driving device 100 comprises a timing controller 1002, a column driver module 1004 and a display module 1006. The timing controller 1002 is utilized for generating displaying data. The column driver module 1004 is coupled to the timing controller 1002 and comprises column drivers C10_1 to C10_n in series for outputting the displaying data according to different coding schemes. In each column driver of the column driver module 1004, a coding unit is utilized for transforming the displaying data to coding results according to a corresponding coding scheme and outputting the coding results to another column driver, and a processing unit is utilized for performing signal processes on the displaying data for generating column driving signals. Therefore, in the driving device 100, each column driver can perform a coding process on the displaying data according to a corresponding coding scheme. The displaying data can be transformed to different coding results by different coding schemes. Compared to the displaying data, there may only a part of the coding results of the column driver C10_1 to C10_n with data transfer states. That is, the column driver C10_1 to C10_n can stagger data transfer states to prevent from increase of instantaneous current caused by signal level change, so as to avoid abnormal frame displaying caused by rising temperatures.

Note that, the driving device 100 is an embodiment of the present invention, and those skilled in the art can make alterations and modifications accordingly. For example, in FIG. 10, the timing controller 1002 also can be coupled between any two column drivers, such as a column driver C10_1 and a column driver C10_2, or coupled to all of the column drivers.

In conclusion, the present invention can perform serial transmission according to different coding schemes for staggering data transfer states in a column driver for reducing instantaneous current caused by signal level change, so as to enhance the reliability.

Those skilled in the art will readily observe that numerous modifications and alterations of the device and method may be made while retaining the teachings of the invention.

What is claimed is:

1. A column driving device for a liquid crystal display (LCD) device comprising:

a serial data generator coupled to a timing controller of the LCD device for transforming parallel data to serial data;

a coding module coupled to the serial data generator comprising a plurality of coding units in series, for performing coding processes on the serial data to generate a plurality of coding results according to a plurality of coding schemes, wherein each coding unit performs a coding process on the received serial data or the received coding result from the previous coding unit to generate a corresponding coding result according to a corresponding coding scheme and the corresponding coding scheme is an error control coding scheme;

a latch module coupled to the coding module for storing the plurality of coding results; and a decoding module coupled to the latch module, comprising a plurality of decoders for performing decoding processes on the plurality of coding results which are already coded on the same column driving device and generating a plurality of column driving signals corresponding to the serial data according to the plurality of coding schemes, wherein each decoder performs a decoding process on the received coding result from the latch module to generate a corresponding column driving signal corresponding to the serial data according to a corresponding error control coding scheme.

2. The column driving device of claim 1, wherein the serial data generator is coupled to a nearest coding unit of the coding module.

3. The column driving device of claim 1, wherein the serial data generator is coupled to all of the coding units of the coding module.

4. The column driving device of claim 1, wherein the serial data generator is coupled between a first coding unit of the coding module and a second coding unit of the coding module, and the first coding unit is adjacent to the second coding unit.

5. The column driving device of claim 1, wherein the latch module comprises:

a first latch module coupled to the coding module; and a second latch module coupled between the first latch module and the decoding module.

6. The column driving device of claim 1, wherein the error control coding scheme is one of binary code, Gray code, Hamming code and Turbo code.

* * * * *